(12) United States Patent
Naval et al.

(10) Patent No.: US 8,552,842 B2
(45) Date of Patent: Oct. 8, 2013

(54) RF WIRELESS PERMANENTLY MOUNTED SEARCHLIGHT

(75) Inventors: Rufino U. Naval, San Juan Capistrano, CA (US); Richard W. Lee, Mission Viejo, CA (US); William B. McDonough, Huntington Beach, CA (US)

(73) Assignee: Xylem IP Holdings LLC, White Plains, NY (US)

( * ) Notice: Subject to any disclaimer, the term of this patent is extended or adjusted under 35 U.S.C. 154(b) by 1286 days.

(21) Appl. No.: 11/019,932

(22) Filed: Dec. 21, 2004

(65) Prior Publication Data

US 2005/0248930 A1 Nov. 10, 2005

Related U.S. Application Data

(60) Provisional application No. 60/533,353, filed on Dec. 29, 2003.

(51) Int. Cl.
*H05B 37/00* (2006.01)

(52) U.S. Cl.
USPC ........................ 340/12.22; 340/12.24; 362/85

(58) Field of Classification Search
USPC ................. 340/825.69, 825.72, 12.22, 12.23, 340/12.5, 13.25, 12.17, 12.24; 362/85, 37, 362/477
See application file for complete search history.

(56) References Cited

U.S. PATENT DOCUMENTS

| | | | | |
|---|---|---|---|---|
| 3,581,276 A * | 5/1971 | Newman | .................... | 340/425.5 |
| 3,774,217 A * | 11/1973 | Bonner et al. | ........... | 340/825.21 |
| 3,793,636 A * | 2/1974 | Clark et al. | .................... | 370/479 |
| 4,072,898 A * | 2/1978 | Hellman et al. | ............... | 375/239 |
| 4,261,634 A * | 4/1981 | Robinson | ....................... | 439/668 |
| 4,598,345 A | 7/1986 | Kleeman | | |
| 4,712,167 A | 12/1987 | Gordin et al. | | |
| 4,779,168 A | 10/1988 | Montgomery | | |
| 4,890,207 A | 12/1989 | Jones | | |
| 4,981,363 A | 1/1991 | Lipman | | |
| 5,029,058 A | 7/1991 | Hirose et al. | | |
| 5,195,813 A | 3/1993 | Brown | | |
| 5,490,046 A | 2/1996 | Gohl | | |
| 5,506,715 A | 4/1996 | Zhu | | |
| 5,584,560 A | 12/1996 | Gosswiller et al. | | |
| 5,673,989 A | 10/1997 | Gohl et al. | | |
| 5,864,297 A * | 1/1999 | Sollestre et al. | ............. | 340/5.23 |
| 5,898,230 A * | 4/1999 | Bartel et al. | ................. | 340/5.26 |
| 6,326,741 B1 | 12/2001 | Hunt et al. | | |
| 6,443,603 B1 | 9/2002 | Eberhardt | | |
| 6,580,368 B1 * | 6/2003 | Jacobs | ...................... | 340/539.11 |
| 6,582,105 B1 * | 6/2003 | Christensen | .................. | 362/385 |
| 2002/0067246 A1 | 6/2002 | Woitschool | | |
| 2002/0149940 A1 | 10/2002 | Fruhm | | |

FOREIGN PATENT DOCUMENTS

WO     WO 96/24801     8/1996

\* cited by examiner

*Primary Examiner* — Edwin Holloway, III

(57) ABSTRACT

The invention provides apparatus for controlling a search lamp using a wireless transmitter and receiver. The transmitter responds to user inputs by providing a wireless digitally encoded modulation signal containing information indicating at least one operation in a set of operations the search lamp is able to perform. The receiver responds to the wireless digitally encoded modulation signal by providing a control signal for controlling the functionality of the search lamp. The functionality may include, for example, moving the search lamp left/right and/or up/down, a sweep on/off @ +/−45 degrees; X/Y/Z movement (Z when motors run simultaneously); Diagonal sweep (motors run simultaneously); Fast/Slow sweep (50%/100%). The transmitter and receiver are programmable to communicate on a unique 16 bit digital code setting that provides about 65K different code settings, which may also include a random code setting.

21 Claims, 11 Drawing Sheets

RF WIRELESS SEARCHLIGHT TRANSMITTER

TRANSMITTER KEYPAD

| FIG.2c-1 | FIG.2c-2 |

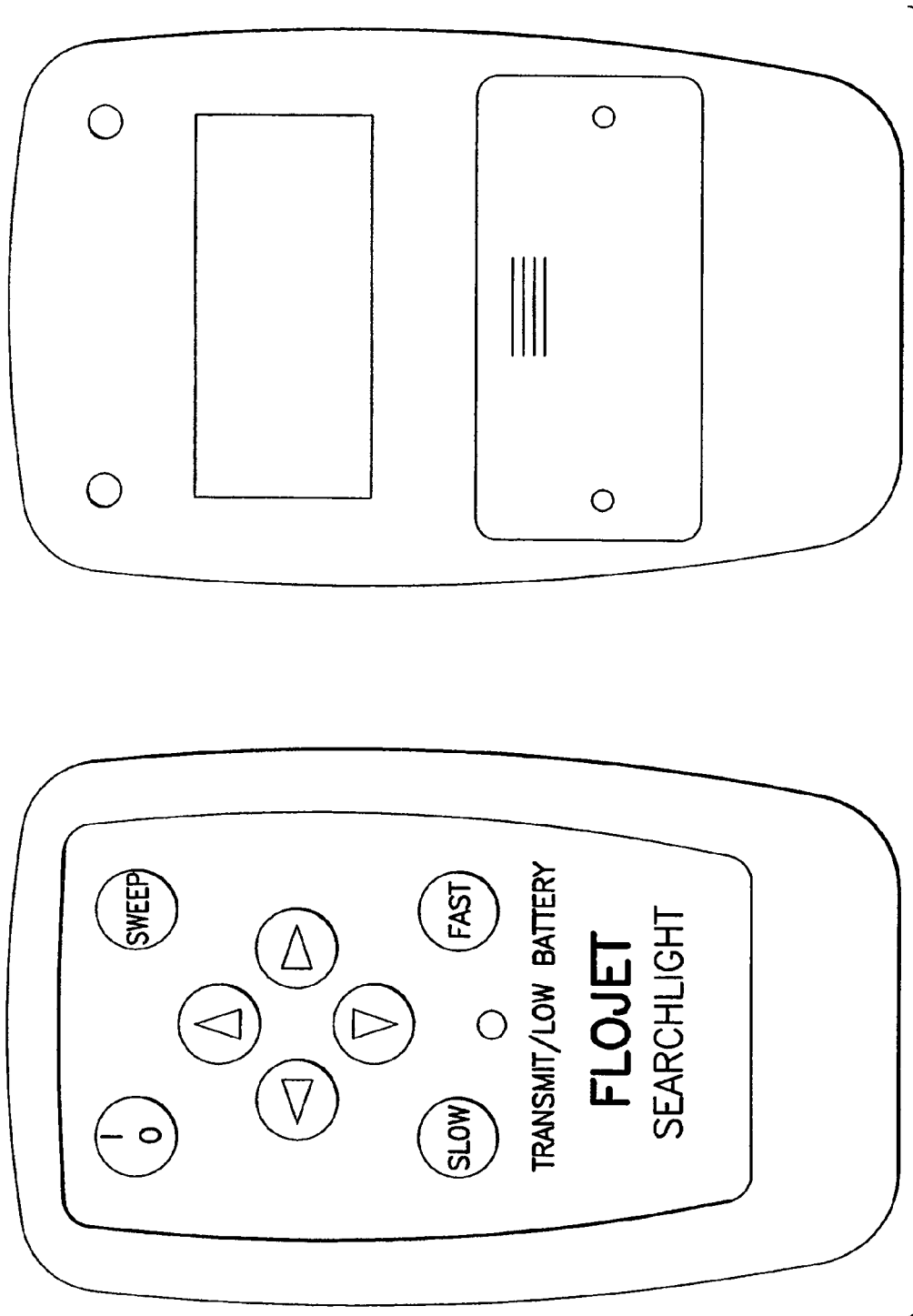

BLOCK DIAGRAM—RECEIVER/CONTROLLER
RF WIRELESS SEARCHLIGHT RX/CONTROLLER

| FIG.3b-1 | FIG.3b-2 |

WIRELESS SEARCHLIGHT
CONTROLLED BY AN EMBEDDED PC

RF WIRELESS PERMANENTLY MOUNTED SEARCHLIGHT

CROSS REFERENCE TO RELATED APPLICATION

This application claims benefit to provisional patent application Ser. No. 60/533,353, filed Dec. 29, 2003, which is hereby incorporated by reference in its entirety.

BACKGROUND OF THE INVENTION

1. Field Of Invention

The present invention relates to a searchlight; and more particularly to a wireless permanently mounted searchlight.

2. Description of Related Art

Many different types and kinds of remotely controlled lights and searchlights are known in the art. By way of example, U.S. Pat. No. 4,779,168 discloses a remote/wireless light system with battery power and includes a transmitter/microprocessor, a receiver/microprocessor, batteries, lamp and positioning device, while U.S. Pat. Nos. 5,490,046 and 5,673,989 disclose a wireless portable searchlight having motors and a battery. However, these patents do not disclose controlling such a remote/wireless light system using a wireless digitally encoded modulation signal. The reader is also referred to U.S. Pat. Nos. and/or patent publication Nos. 4,598,345; 5,506,715; 4,712,167; 4,779,168; 4,890,207; 4,981,363; 5,029,058; 5,195,813; 5,490,046; 5,584,560; 5,673,989; 6,326,741; 6,443,603; 2001/0067246; 2002/0149940; and WO 96/24801, which disclose other known lighting devices.

SUMMARY OF INVENTION

In its broadest sense, the present invention provides a new and unique apparatus for controlling a search lamp using a wireless transmitter and receiver combination. The transmitter responds to user inputs and provides a wireless digitally encoded modulation signal containing information indicating at least one operation in a set of operations the search lamp is able to perform. The receiver responds to the wireless digitally encoded modulation signal and provides a control signal for controlling the functionality of the search lamp.

The functionality of the search lamp may include, for example, moving the search lamp horizontally (e.g. left/right), or vertically (e.g. up/down), or diagonally (e.g. both left/right and up/down), or a horizontal, vertical or diagonal (+/−45 degrees with both motors run simultaneously) sweep (on/off); X/Y/Z movement (Z when motors run simultaneously); fast/slow sweep (e.g. 50%/100%), or some combination thereof.

The transmitter and receiver are programmable to communicate on a fixed frequency using a unique 16 bit digital code setting that provides about 65K different code settings, which may also include a random code setting.

The wireless searchlight may also include a voltage regulator for converting a battery voltage in a predetermined range, for example, 9-30 voltages, to a desired battery voltage for operating the searchlight. In particular, the voltage regulator may convert a car battery voltage of about 12 volts to the desired battery voltage, as well as convert a boat battery voltage of about 24 volts to the desired battery voltage. The wireless digitally encoded modulation signal controls the operation of the wireless searchlight using a single channel and may include using a single-frequency shift key (FSK) signal.

The transmitter may take the form of a handheld battery power transmitter having a transmitter module for performing the functionality described above. Alternatively, the searchlight may be operated by a controller that may take the form of an embedded personal computer (PC), personal digital assistant (PDA) or other suitable or custom controller that works alone or together with a modified transmitter consistent with that described herein. In this case, the modified transmitter may include a modified transmitter module for performing a reduced version of the functionality defined herein for the aforedescribed battery power handheld transmitter.

One advantage of the RF wireless searchlight according to the present invention is that the FM wireless digitally encoded modulation wireless signal, especially at a frequency of 434 Mhz, eliminates interferences otherwise caused if an AM signal was used in relation to noise generated from driver motors moving the search lamp; minimizes FM interferences in relation to signals generated from various other devices otherwise broadcasting typically in a range of 303-390 Mhz, including garage door openers, lighting controls and ceiling fan controls; is a worldwide accepted frequency, for example, in the U.S., Europe and Canada, increasing the potential marketplace for your company's searchlight as a whole. Also FM is resistant to on-vehicle generator and engine electrical noise. It is omnidirectional so there are no line-of-sight issues like those using directional antenna signals. For example, in one known searchlight using an AM-based RF wireless system the AM noise and interference from the driver motor moving the search lamp may actually prevent the stopping of the search lamp once it is set in motion.

BRIEF DESCRIPTION OF THE DRAWING

The drawing, not drawn to scale, includes the following Figures:

FIG. 2(d) shows front and back pictures of the RF searchlight transmitter consistent with that shown in FIG. 2(a).

DETAILED DESCRIPTION OF INVENTION

Figure 1:
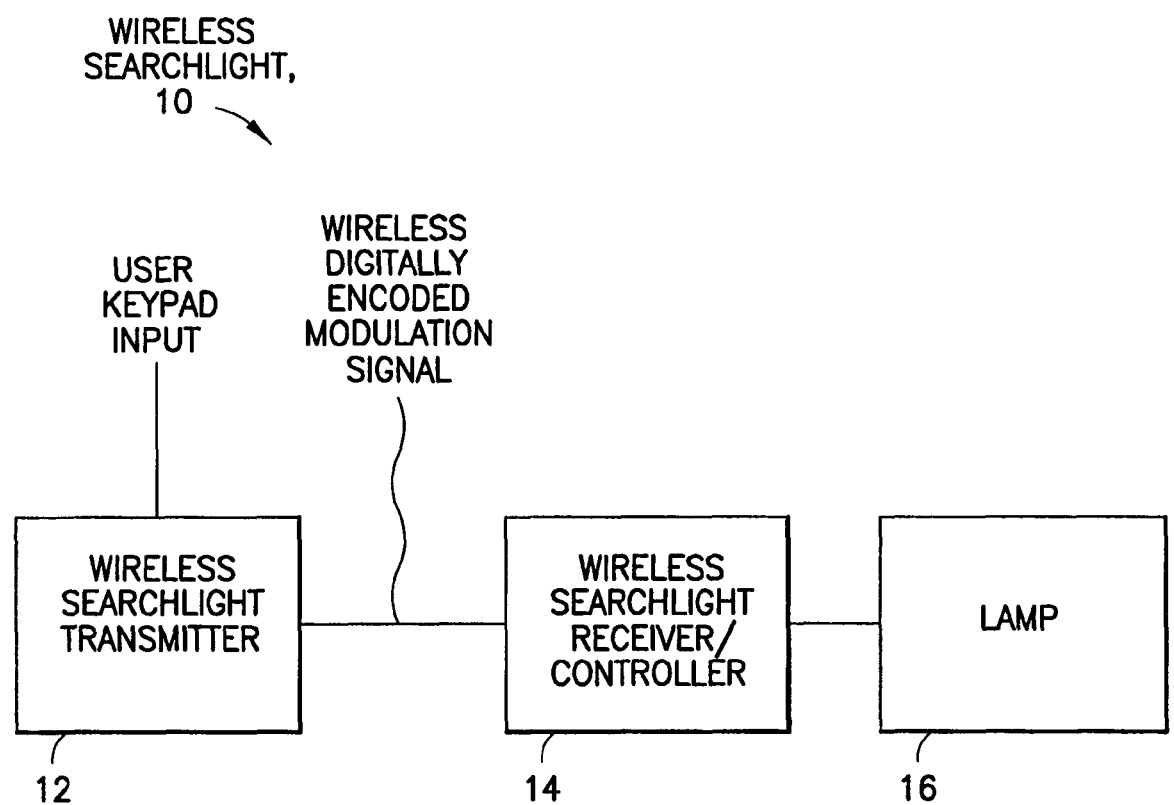
FIG. 1 shows a block diagram of an RF wireless searchlight according to the present invention.

FIG. 1: The Basic Invention

FIG. 1 shows a new and unique wireless searchlight 10 according to the present invention, featuring a wireless searchlight transmitter 12, a wireless searchlight receiver/controller 14 and a searchlight or lamp 16. In operation, the wireless searchlight transmitter 12 responds to user inputs, and provides a transmitter control signal in the form of a wireless digitally encoded modulation signal to the wireless searchlight receiver/controller 14; and the wireless searchlight receiver/controller 14 responds to this transmitter control signal and provides signals for controlling the functionality of the searchlight or lamp 16. The user inputs may be in the form of user keypad inputs, as well as other suitable user inputs, including voice and/or other audio commands. The scope of the invention is not intended to be limited to the manner in which the user provides the inputs too the transmitter. The wireless digitally encoded modulation signal contains information indicating at least one operation in a set of operations the searchlight or lamp is able to perform, which may include, by way of example, moving the search lamp horizontally (e.g. left/right), or vertically (e.g. up/down), or diagonally (e.g. both left/right and up/down), or a horizontal, vertical or diagonal (+/−45 degrees with both motors run simultaneously) sweep (on/off); X/Y/Z movement (Z when motors run simultaneously); fast/slow sweep (e.g. 50%/100%), or some combination thereof. The scope of the invention is not intended to be limited to the type or kind of operation that the searchlight or lamp is able to perform, and is intended to include operations now known in the art and later developed in the future.

Figure 2A:
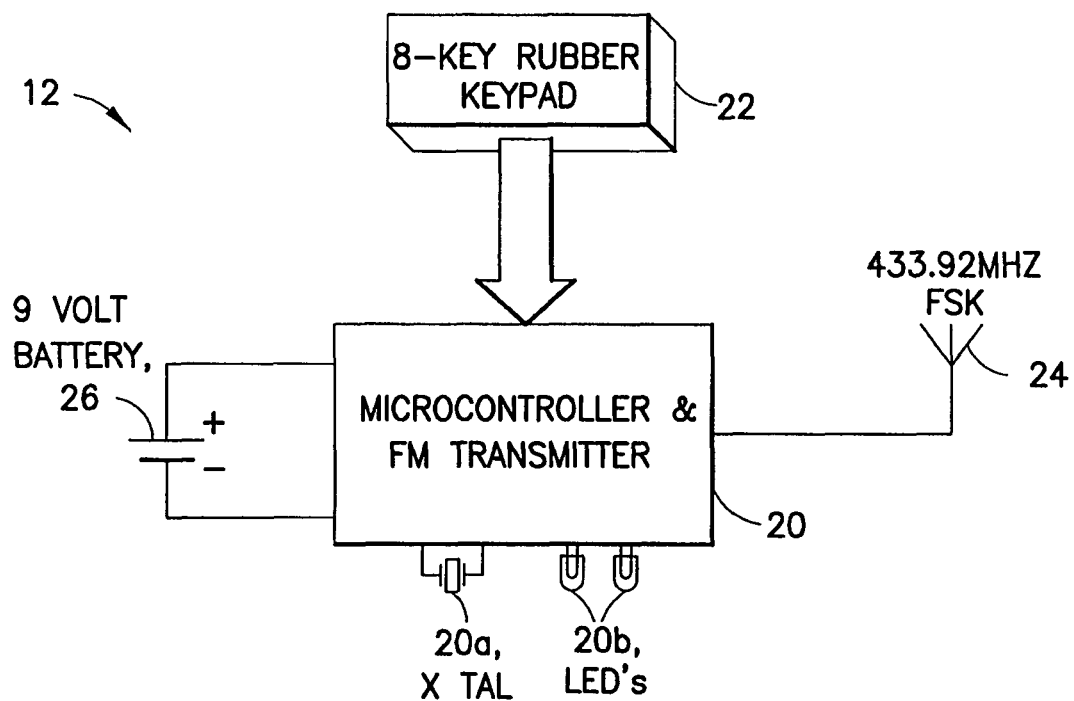
FIG. 2(a) shows a block diagram of an RF wireless searchlight transmitter shown in FIG. 1.

FIG. 2(a): RF Wireless Searchlight Transmitter 12

FIG. 2(a) shows the RF wireless searchlight transmitter 12, which includes a microcontroller and FM transmitter 20, a user keypad 22, an antenna 24 and a battery 26 for powering the same. The microcontroller and FM transmitter 20 is coupled to a crystal 20a and LEDs 20b, both discussed below. In operation, the user provides one or more user keypad inputs to the keypad 22, the microcontroller and FM transmitter 20 encodes the one or more user keypad inputs, and provides the transmitter control signal which is transmitted via the antenna 24 to the controller 14 for controlling the operation of the lamp 16.

Figure 2B:
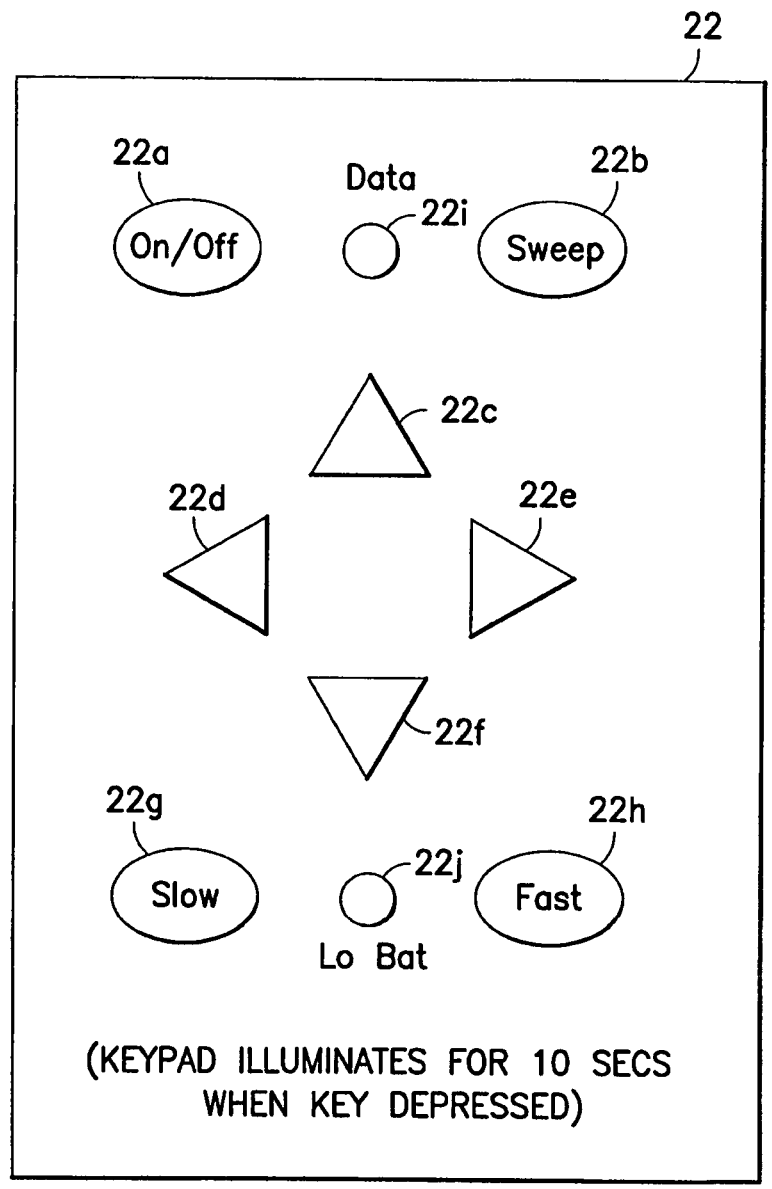
FIG. 2(b) shows a transmitter keypad shown in FIG. 2(a).

FIG. 2(b): Keypad 22

FIG. 2(b) shows, by way of example, that the user keypad 22 in the form of an 8-key rubber keypad which includes an on/off key 22a, a sweep key 22b, an up key 22c, a left key 22d, a right key 22e, a down key 22f, a slow key 22g and a fast key 22h. The 8-key rubber keypad 22 also includes a data LED 22i for indicating a data transmission and a lo bat LED 22j for indicating a low battery, which are also shown as LEDs 20b in FIG. 2(a). In operation, the keys may be backlit so that the keypad illuminates for about 10 seconds when a key is depressed. The scope of the invention is not intended to be limited to any particular type or kind of keypad, arrangement of keys and/or LEDs, function of keys and/or LEDs, etc.; and embodiments of the invention are envisioned having other types or kinds of keypads, arrangement of keys and/or LEDs, function of keys and/or LEDs that are either now known or later developed in the future.

The Transmitter's Functionality

The functionality of the transmitter, including the microcontroller and FM transmitter 20 and the keypad 22, may include one or more of the following functions or operations:

ON/OFF Key or Button 22a: When activated, the ON/OFF key or button 22a toggles the state of the lamp 16 from OFF to ON or from ON to OFF. The lamp 16 may be programmed to shut OFF automatically after a predetermined period of time if the feature is enabled.

SWEEP Key or Button 22b: When depressed, the SWEEP key or button 22b will initiate a "back and forth" operation of the horizontal positioning motor (only) for sweeping the search lamp 16 horizontally back and forth, although embodiment are also envisioned in which the search lamp may be swept vertically up and down, alternatively. The sweep rate is determined by the FAST/SLOW setting, and the scope of the invention is not intended to be limited to any particular sweep rate. The sweep range is about +/−45 degrees, although the scope of the invention is not intended to be limited to any particular sweep range. Embodiments are envisioned having sweep ranges of more or less than 45 degrees. In operation, depressing the SWEEP key or button 22b again will cancel this sweeping operation. Moreover, depressing any of the four-direction keys or buttons 22c, 22d, 22e, 22f may also override the sweep action while they are depressed, allowing a re-positioning of the sweep field.

If the end of rotation limit is detected, the receiver/controller 14 will correct the sweep range to compensate for the same.

DIRECTION Keys or Buttons (four) 22c, 22d, 22e, 22f: There are 4 keys or buttons 22c, 22d, 22e, 22f corresponding to RIGHT and LEFT in the horizontal plane and UP and DOWN in the vertical plane. When depressed, these buttons 22c, 22d, 22e, 22f transmit the specific direction information to the receiver/controller 14. This information is transmitted as long as the button 22c, 22d, 22e, 22f is depressed and ceases immediately when the button 22c, 22d, 22e, 22f is released, i.e. not depressed. In the event that an end of rotation limit is encountered, the receiver/controller 14 will cease motion until the direction is reversed or another plane is selected. The transmitter 12 will typically allow two directional buttons 22c, 22d, 22e, 22f to be depressed simultaneously provided that they are not in opposition to one another. This allows the diagonal motion in that both horizontal and vertical motors are running. However, depressing both the UP and DOWN buttons or RIGHT and LEFT will typically result in NO command being transmitted, although embodiments are envisioned in which some other functionality is built into such user inputs.

SLOW Key or Button 22g: When depressed, the SLOW key or button 22g enables the SLOW speed. All subsequent direction keys will operate the searchlight motors at approximately 50% applied voltage, although the scope of the invention is not intended to be limited to any particular percentage. Embodiments are envisioned in which some other slow rate or percentage is used such as 40% or 60%, etc., as well as multiple slow rates are programmable. The SLOW rate will be active until the FAST key or button 22h is depressed.

FAST Key or Button 22h: When depressed, the FAST key or button 22g enables the FAST speed. All subsequent direction keys will operate the searchlight motors at full 100% applied voltage. The FAST rate will be active until the SLOW key 22g is depressed.

DATA LED 22i: The data light 22i is active whenever any data is being transmitted from the transmitter 12 to the receiver 14. The data LED 22i will blink a very rapid rate determined by the data stream being transmitted, visible to the eye as random quick blink.

LOW BAT LED 22j: The LOW BAT LED 22j will blink at approximately a 0.5 second ON, 2 second OFF rate continuously whenever a low battery condition is detected, although the scope of the invention is not intended to be limited to this duty cycle. A low battery condition is defined as a voltage of less than 7.0 volts DC (VDC) when the transmitter 12 is active or 8.0 VDC when the transmitter 12 is turned OFF.

Automatic Lamp OFF: To prevent the possibility of that the lamp 16 is left ON during the daylight and not noticed by the user, or that the transmitter unit 12 has failed, the receiver/ controller 14 may be programmed to automatically shut the lamp 16 OFF after a predetermined amount of time (e.g. 15 minutes) of operation. The automatic timeout can be disabled by depressing the Right and Left keys 22d and 22e on the transmitter keypad 22; the searchlight 16 will blink ON/OFF to indicate it has received the command. Embodiments are also envisioned in which the predetermined amount of time of operation is programmable by the user and may be changed depending on the type of application.

The functionality of the microcontroller and FM transmitter 20 may be implemented using hardware, software, firmware, or a combination thereof. In a typical software implementation, the microcontroller and FM transmitter 20 would include one or more microprocessor-based architectures having a microprocessor, a random access memory (RAM), a read only memory (ROM), input/output devices and control, data and address buses connecting the same. This particular implementation is unique in that one physical device (chip) contains both the microcontroller and the transmitter. A person skilled in the art would be able to program such a microprocessor-based implementation to perform the functionality described herein without undue experimentation. The scope of the invention is not intended to be limited to any particular implementation using technology known or later developed in the future.

Figure 5:
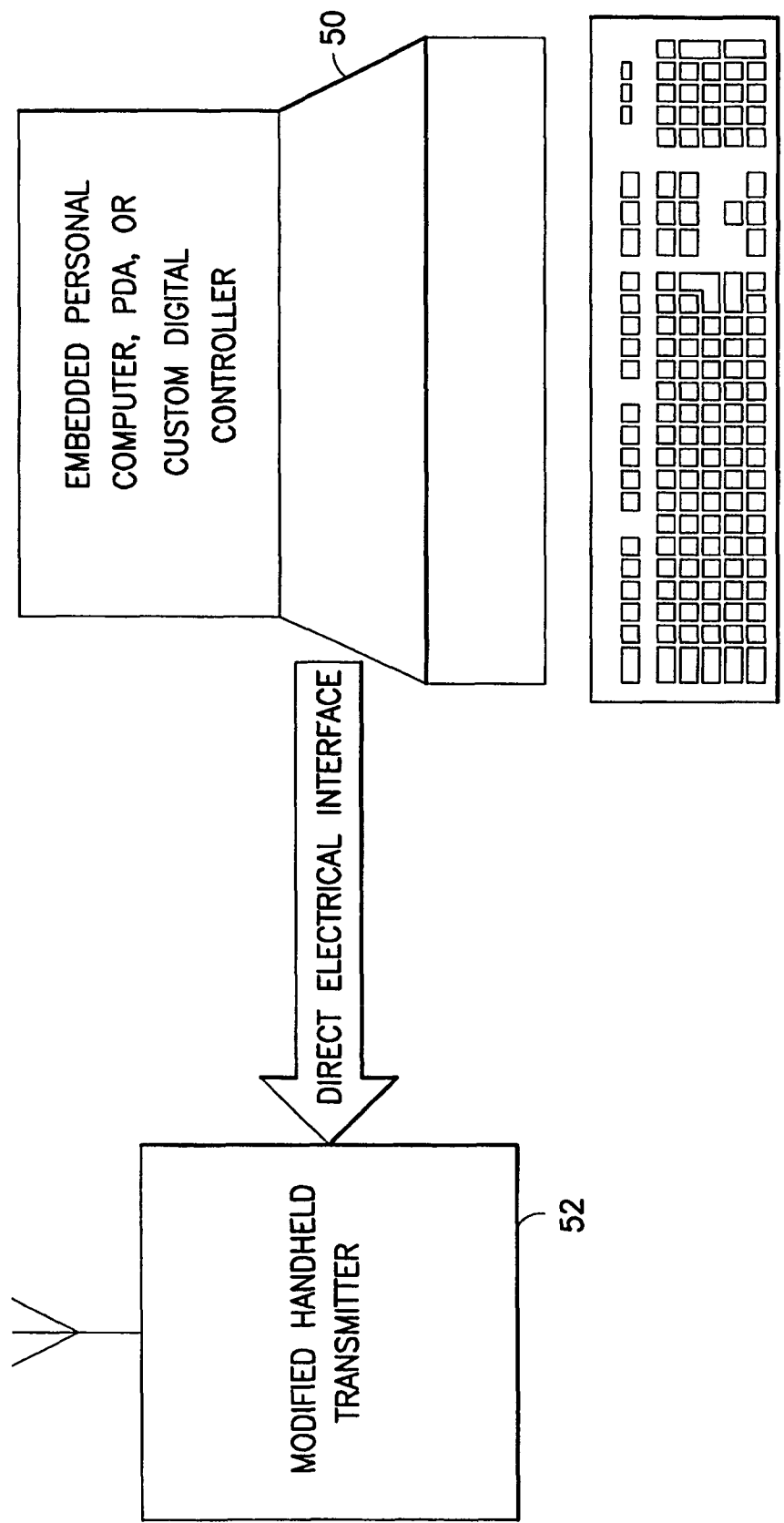
FIG. 5 shows a block diagram of a wireless searchlight controlled by an embedded PC.

Moreover, the scope of the invention is intended to include controlling the searchlight 16 (FIG. 1) via an independent controller such as a personal computer directly interfacing to the transmitter according to the present invention. For example, FIG. 5 shows an electronic controller 50 having a keyboard 51, that may take the form of an embedded PC, PDA or customer digital controller, and that provides a direct electrical interface signal to a modified handheld transmitter 52 for controlling the wireless searchlight 16 according to the present invention. In operation, the wireless searchlight 16 is remotely controlled by the electronic controller 50 which has the functionality defined in the hand-held transmitter 12 described above via a control signal over a dedicated interface to the modified wireless transmitter while operating in conjunction with, and/or independent of, the battery powered transmitter 12. In particular, the electronic controller 50 may include or form part of a system disclosed in U.S. patent application Ser. No. 10/818,197, filed Apr. 5, 2004, entitled "Active Sensing and Switching Device," as well as Patent Application Ser. Nos. 60/415,717, filed Apr. 25, 2003; 60/514,861, filed Oct. 27, 2003; and PCT/US2004/011911, filed Apr. 14, 2004, all of which are incorporated by reference herein in their entirety. This embodiment may include a touch screen embedded PC to a wireless searchlight interface and include a modified transmitter module that interfaces electronically to a PC/PDA instead of using key buttons like the transmitter 12 (FIG. 1).

Figures 1, 2C:
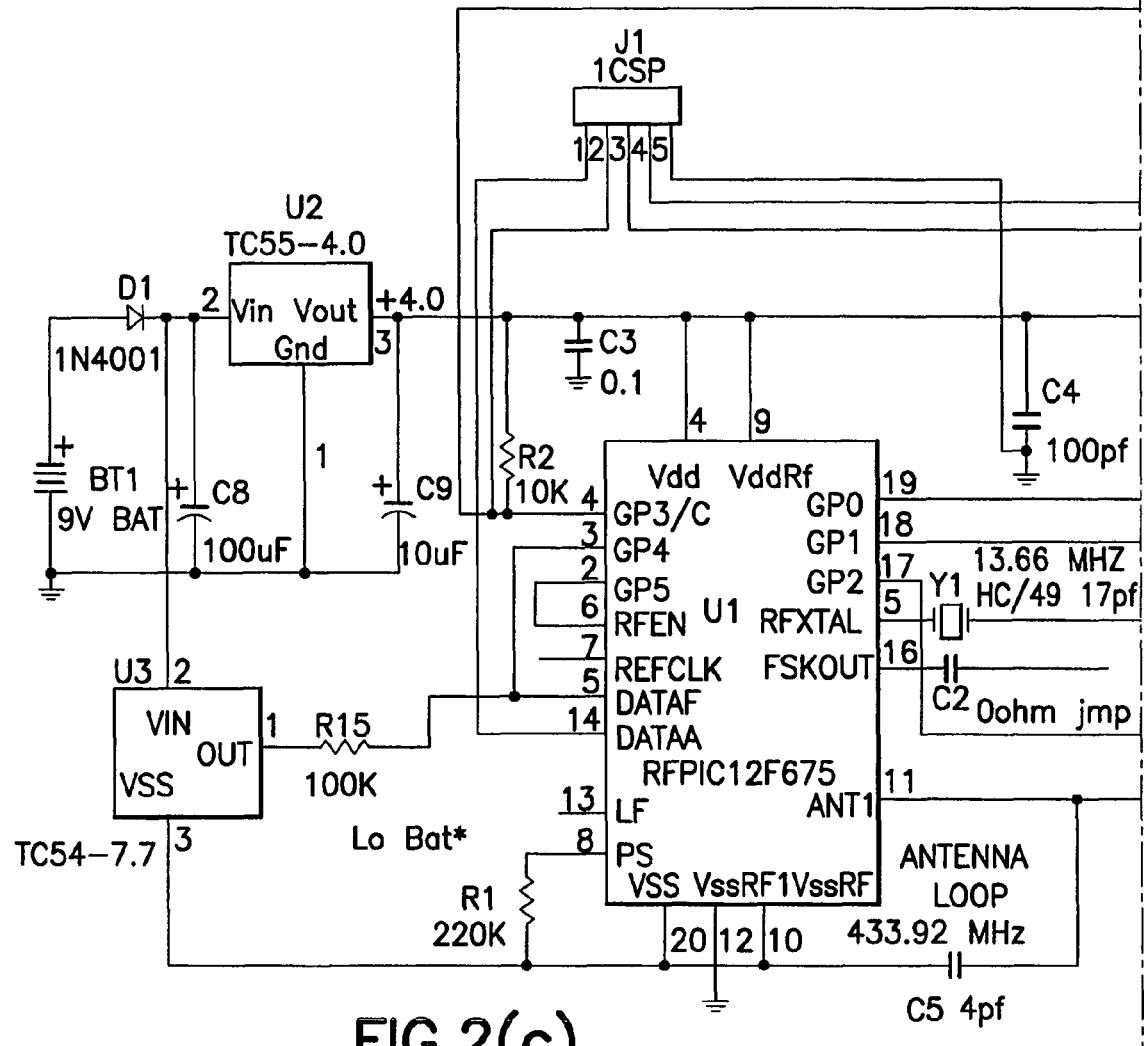
FIG. 2(c) shows a circuit diagram of an RF searchlight transmitter shown in FIG. 1.

FIG. 2(c): Circuit Diagram of the RF Searchlight Transmitter 12

By way of example, FIG. 2(c) shows a circuit diagram of the RF searchlight transmitter 12 shown in FIG. 1, which is provided as one example of how to implement a RF searchlight transmitter circuit. The scope of the invention is not intended to be limited to any particular type or kind of circuit design; and embodiments of the invention are envisioned having another type or kind of circuit design, using other types of circuit components keys and/or LEDs that are either now known or later developed in the future.

The Transmission Modulation Technique

The transmitter 12 and the receiver/controller 14 communicate using a new and unique FM wireless digitally encoded transmission modulation technique, which in the preferred embodiment includes using an FM (Frequency Shift Key) FSK scheme at a data rate of less than 1,000 bits per second (BPS) with a transmitter frequency of 433.92 Mhz UHF, that is crystal controlled, to be consistent with U.S., Canadian, and European regulations for remote control. One important advantage of this technique is that the use of this frequency provides for a searchlight design that may be sold in many different consumer markets around the world.

In operation, a complete transmission from the transmitter 12 to the receiver controller 14 may consist of a synchronization frame having 16 bits of unique address information, 8 bits of key code information, and an 8-bit checksum, although the scope of the invention is not intended to be limited to any particular number of transmission bits in each field of the frame. This synchronization frame may be repeated multiple time (e.g. three times) each time a valid key closure is detected and is repeated as long as the key is depressed.

An encoding scheme may be used that is a pulse-position modulation (PPM) scheme, although the scope of the invention is not intended to be limited to using an encoding scheme ot to any particular encoding scheme, if used.

It is important to note that the scope of the invention is not intended to be limited to only this transmission modulation technique, because embodiments are envisioned using other FM wireless digitally encoded transmission modulation technique either now known or later developed in the future, as well as other transmitter frequencies.

Some Other Important Transmitter Design Features

Some other important design features for the transmitter 12 may include the following:

Battery: The battery to power the transmitter 12 is preferably a standard 9V rectangular battery that is common to consumer products, although the scope of the invention is not intended to be limited to any particular type or kind of battery or battery voltage. It is noted that a high capacity alkaline battery, such as the Energizer $e^2$ X22 model, is recommended (655 MAH) for maximum life. For extended temperature ranges, an Ultralife U9VL lithium cell is recommended. The battery life shall preferably be approximately 2 years under light usage of 2 minutes of transmission per week using an alkaline battery.

Quiescent Current: In the transmitter 12, the quiescent current is preferably expected not to exceed 2.0 microamps (Ua) when not transmitting in order to maintain a longer battery life, although the scope of the invention is not intended to be limited to any particular quiescent current.

Current Drain: In the transmitter 12, the current drain when transmitting shall not exceed 30 milliamps (Ma); the current drain while the keypad is illuminated but finished transmission shall not exceed 10 Ma, although the scope of the invention is not intended to be limited to any particular current drain.

The microcontroller 20 shall be regulated by an LDO to about 3.0 V, although the scope of the invention is not intended to be limited to any particular voltage.

The 8-button rubber keypad 22 discussed above may be made of a translucent color capable of being momentarily back-illuminated.

The lo bat LED indicator 22j may show the low battery condition by blinking; and the data transmission LED 22i may light to indicate that data is being transmitted when a key is depressed.

The design of the transmitter 12 would preferably comply with FCC Part 15 regulations governing remote control devices with intermittent transmission.

Figure 3A:
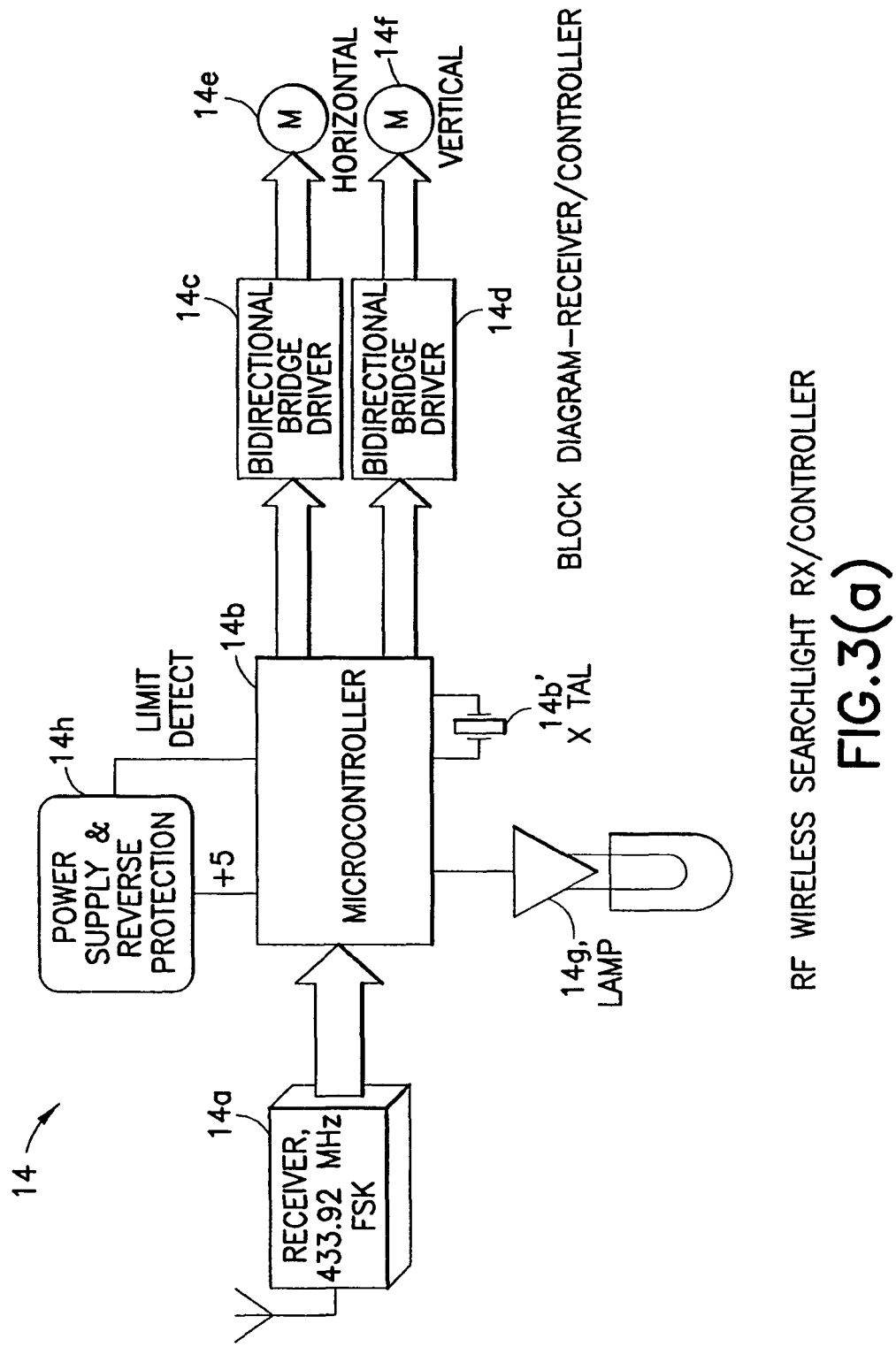
FIG. 3(a) shows a block diagram of an RF wireless searchlight RX/controller shown in FIG. 1.

FIG. 3(a): RF Wireless Searchlight RX/Controller 14

FIG. 3(a) shows the RF wireless searchlight RX/controller 14 having a receiver 14a, a microcontroller 14b, a bidirectional bridge drivers 14c, 14d, horizontal and vertical motors 14e, 14f, lamp driver 14g and power supply and reverse protection 14h.

Figures 1, 3B:
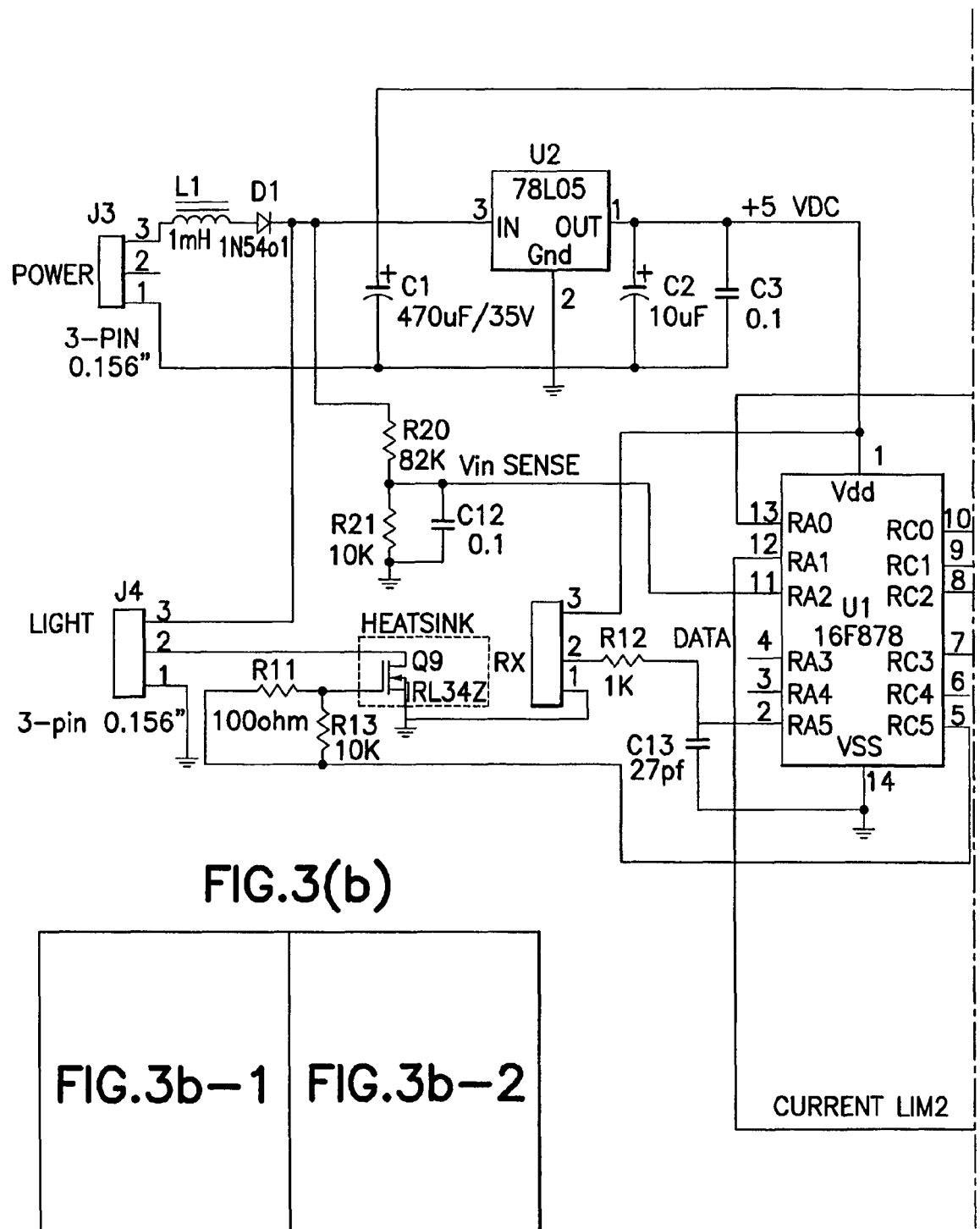
FIG. 3(b) shows a circuit diagram of an RF wireless searchlight RX/controller shown in FIG. 3(a).
Figures 2, 3B:
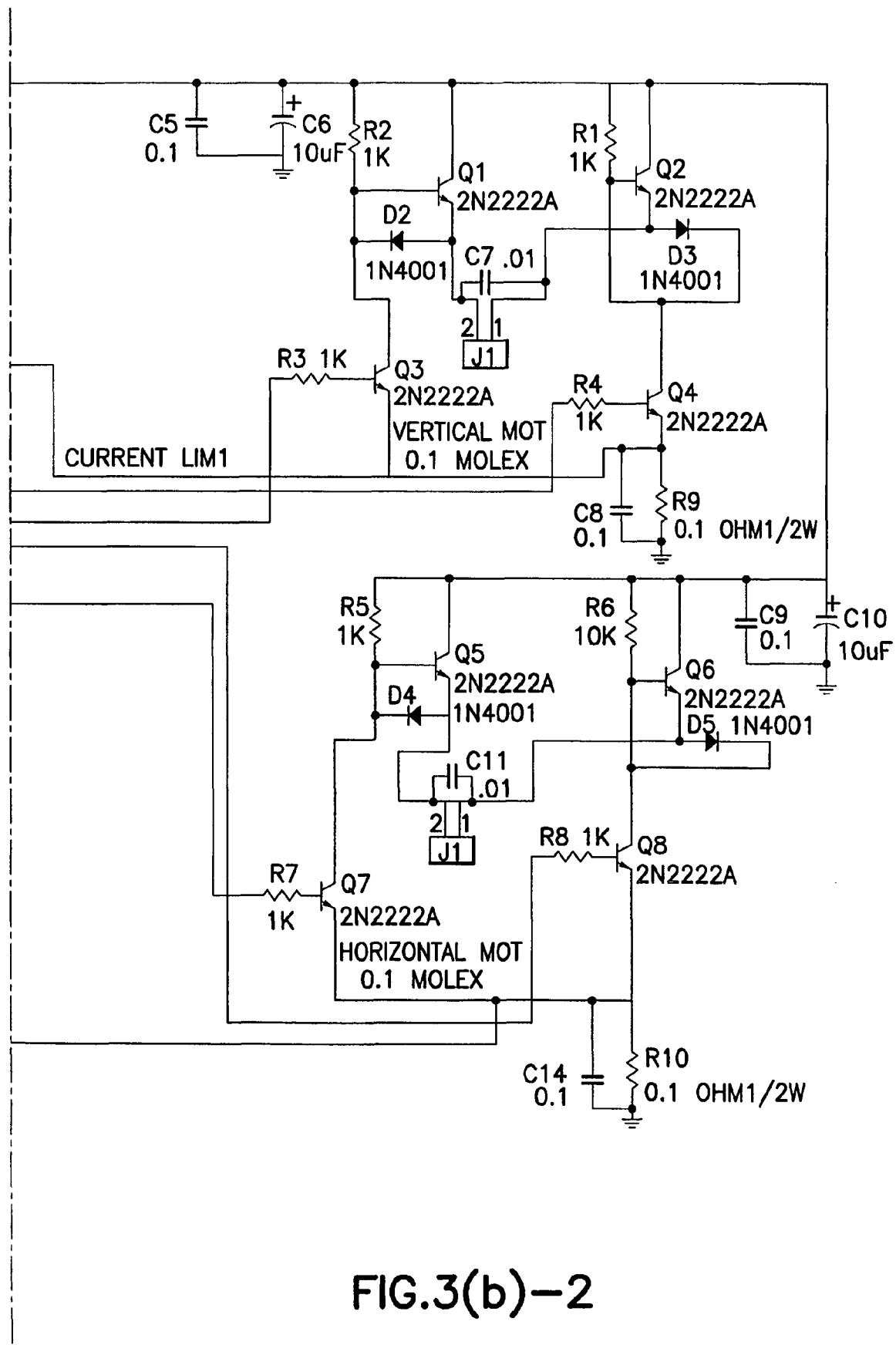
Figure 4A:
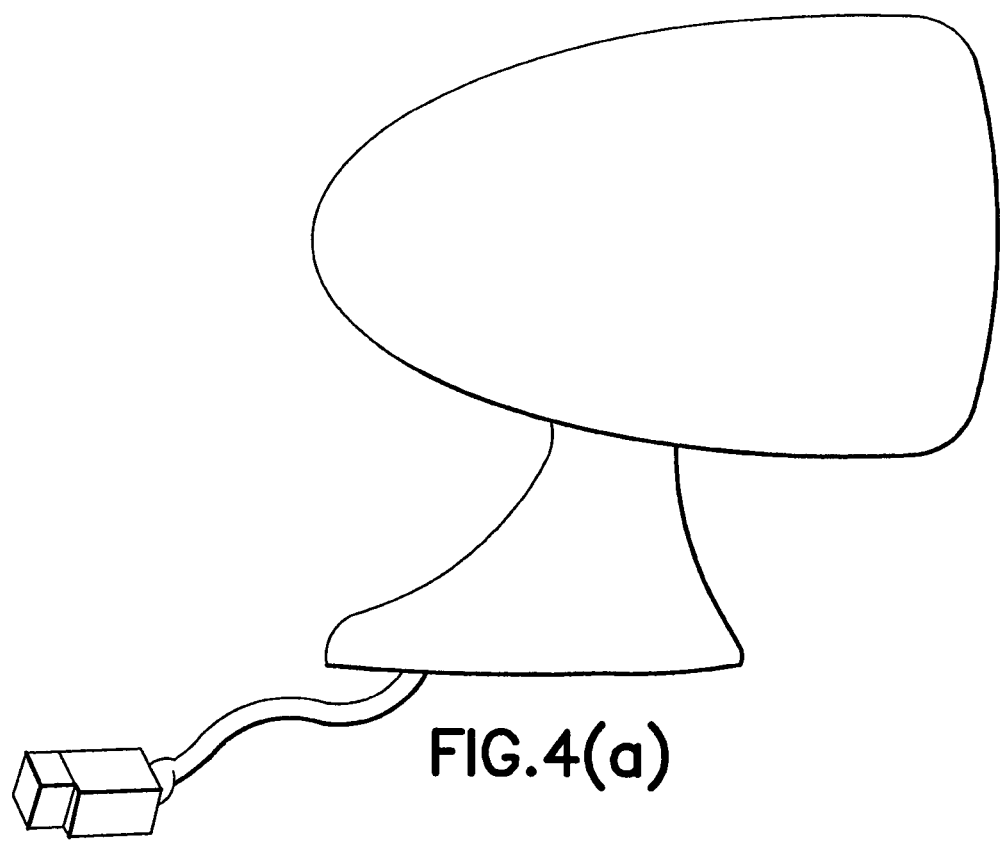
FIGS. 4(a) and (b) show a side and bottom view of the RF searchlight according to the present invention shown in FIG. 1.
Figure 4B:
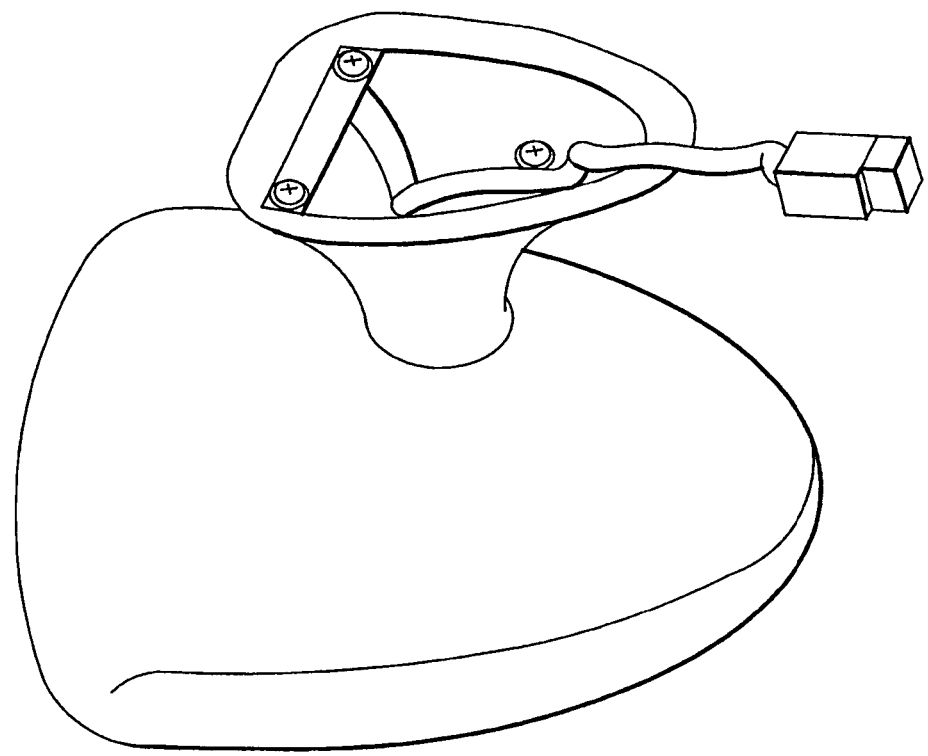

FIGS. 3(a) and 3(b): Receiver/Controller 14

FIG. 3(a) shows the receiver/controller 14 having a receiver 14a, a microcontroller 14b with a crystal 14b', bidirectional bridge drivers 14c and 14d, a motor 14e for horizontal lamp movement, a motor 14f for vertical lamp movement, a lamp driver 14g and a power supply and reverse protection module 14h. In operation, the receiver 14a response to a transmitter control signal from the transmitter 12, for providing a controller signal for controlling the functionality of the search lamp 16. Consistent with that discussed above, the transmitter control may take the form of a wireless digitally encoded modulation signal. In particular, the receiver 14a provides the transmitter control signal to the microcontroller 14b, which processes the same, provides microcontroller bridge driver signals to one or more of the bidirectional bridge drivers 14c and 14d for actuating the motors 14e and 14f to move the lamp 16, as well as microcontroller lamp driver signals to the lamp driver 14g to turn the lamp ON and OFF.

As shown, the power supply and reverse protection module 14h provides a 5 volt signal to the microcontroller 14b, and responds to a limit detect signal from the microcontroller to provide reverse protection.

The functionality of the microcontroller 14b may be implemented using hardware, software, firmware, or a combination thereof. In a typical software implementation, the microcontroller 14b would include one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology known or later developed in the future.

FIG. 3(b): Circuit Diagram of the Microcontroller 14b

By way of example, FIG. 3(b) shows a circuit diagram of the microcontroller 14b shown in FIG. 3(a), which is provided as one example of how to implement the functionality of the same. The scope of the invention is not intended to be limited to any particular type or kind of circuit design; and embodiments of the invention are envisioned having another type or kind of circuit design, using other types of circuit components that are either now known or later developed in the future.

Corresponding Transmission Modulation

In operation, the receiver 14 will receive FM FSK data at a rate of about 1 kilobit per second (Kbps). The data format is PPM. The center frequency of reception shall be 433.92 Mhz, controlled by crystal 14b'.

The transmission modulation technique includes code setting for each transmitter and receiver combination. For example, each transmitter 12 may have a unique 16-bit digital code, which is embedded sequentially as the units are programmed. In this case, the receiver 14 must be "matched" to the transmitter code before control is possible. This is accomplished via a learning mode in which the receiver/controller 14 can store the digital code in non-volatile memory. This LEARN mode may be activated on the transmitter 12 by depressing both the SLOW and FAST buttons at the same time, although the scope of the invention is not intended to be limited to any particular simultaneous depression of key combinations. This transmits a special LEARN code instead of the normal SLOW or FAST commands. The receiver/controller 14 will accept this code as valid ONLY if it is activated within 5 minutes (or any other suitable time period) of application of power to the receiver/controller 14. This prevents an adjacent searchlight (not shown) from learning the specific transmitter. After 5 minutes of power, this learning mode is DISABLED in the receiver/controller.

The transmission modulation technique includes code matching for each transmitter and search light combination. In effect, before the searchlight is functional, it must learn the code of the transmitter supplied with it. This may be performed at the factory before the combination is shipped, or the user in the field may perform it.

Other Design Considerations

Some other design considerations include the following:

The receiver/controller 14 may also be capable of being powered by DC voltage of +9.0 to +30 VDC. It may have reverse voltage protection that is capable of protecting the printed circuit board (PCB) at the expense of an external fuse. Note that the motor and lamp bulbs should match the incoming voltage.

The receiver/controller quiescent current should be less than 10 Ma when lamp 16 (FIG. 1) and motors 14e and 14f are in the standby condition.

The receiver/controller 14 may be capable of controlling the lamp 16 having a resistive filament of up to 70 watts of power continuously.

As shown, there are two independent motor drive outputs from bidirectional bridge drivers 14c, 14d. Each must be capable of bi-directional operation (bridge driver) with a nominal current of 300 Ma continuous and 900 Ma inrush and locked momentarily.

The receiver controller 14 may have current limiting capability to shut off either or both motors when the current exceeds 800 Ma total drain.

The receiver/controller 14 may be capable of running at two speeds: FAST at with 100% voltage and SLOW with 50% voltage applied to the motors, although the scope of the invention is not intended to be limited to any particular percentage of movement speeds.

Consistent with that discussed above, the receiver/controller 14 may run both the horizontal and vertical motors 14e and 14f simultaneously to produce a "diagonal" movement of the search light 16.

The receiver/controller 14 may also be able to provide a "sweep" mode consistent of "back and forth" motion of the horizontal plane representing a field of approximately 90 degrees.

Range: The transmitter 12 to receiver/controller 14 shall have a minimum useable range of approximately 50 meters over a flat terrain line of sight with searchlight mounted on the highest portion of the vehicle.

Figures 2, 2C:
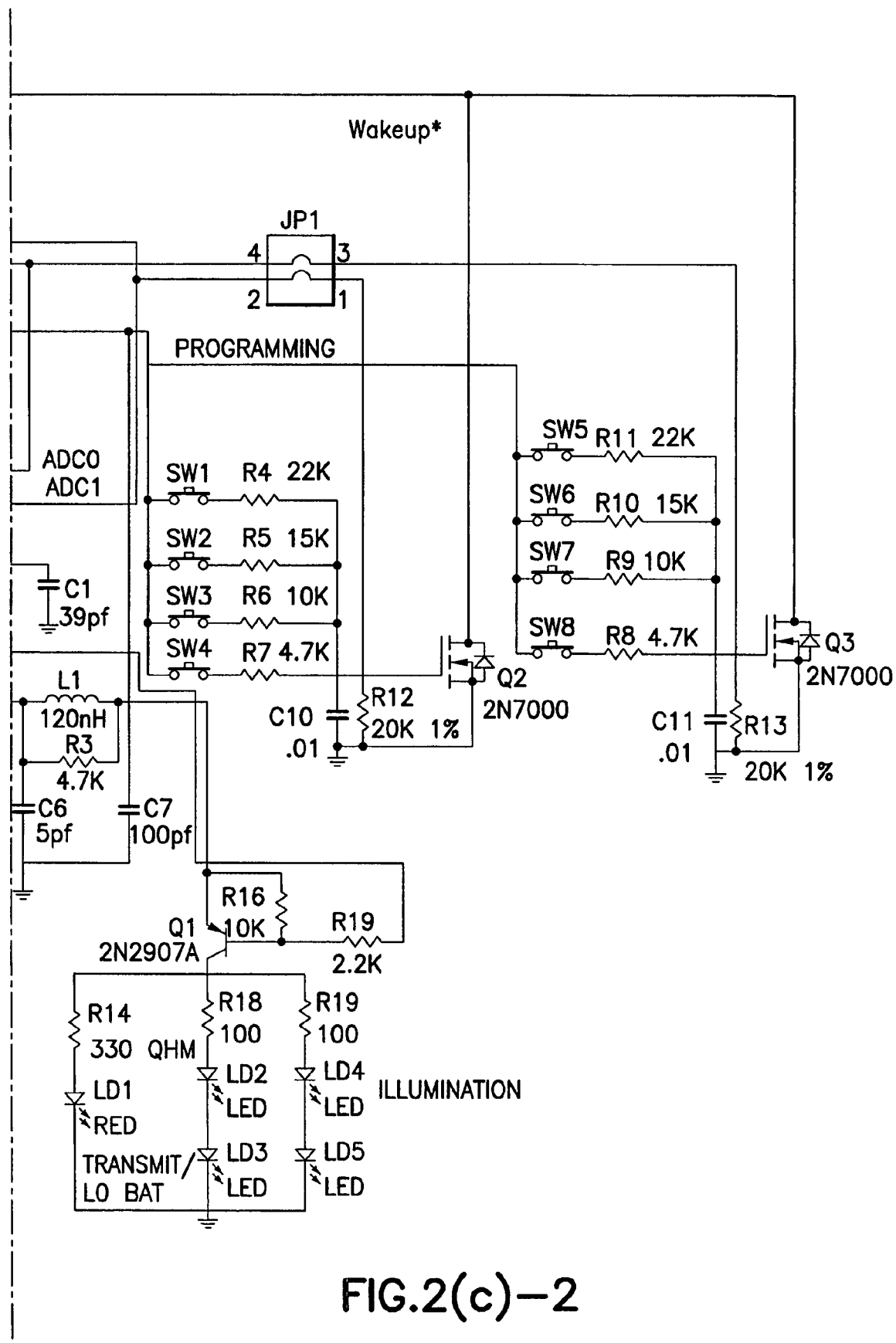

Battery Replacement: The transmitter battery 26 (FIG. 2(*a*)) may be replaced by sliding the door on the back of the transmitter case. All data is in flash (nonvolatile) data memory, so the battery 26 may be removed indefinitely with no loss of present configuration data.

Multiple transmitters: The receiver/controller may be able to learn a plurality of transmitter code, e.g. up to four distinct transmitter codes. The storage arrangement is implemented as a FIFO (first in first out). Hence, if more than 4 unique codes are entered, the oldest (first) code will be purged from the FIFO.

Replacement transmitters: Consistent with that described above, if the current transmitter fails, a replacement transmitter must first be LEARNED as specified elsewhere in this document.

Replacement receiver/controller: In the event the receiver/controller fails and the PCB is replaced, it must first LEARN the code as described elsewhere in this document. Loss of vehicle power or vehicle battery replacement does not require any re-learn sequence.

The receiver 14 shall preferably comply with FCC Part 15 regulations for unintentional radiators.

Some Other Environmental Considerations

Some other environmental considerations for the transmitter 12 and/or receiver/controller 14 may include the following:

The transmitter 12 should be capable of operation over the range of the battery used. A typical 9V battery is specified at −10 to +50 degrees C. A lithium 9V battery is rated at −20 to +70 C and is recommended for extreme temperature range applications.

The transmitter 12 should also be capable of operating over the humidity range of 0 to 95% relative humidity continuously.

The transmitter 12 should resist water penetration when enclosed in its protective transparent glove.

The receiver/controller 14 should be capable of operating over the range of 0 to 70 degrees C.

The receiver/controller 14 shall be capable of operating over the humidity range of 0 to 95% relative humidity continuously.

The receiver/controller 14 shall be conformal-coating and be capable of resistant direct water sprat to the case with proper mechanical design.

Some Physical Design Considerations

Some other physical design considerations for the transmitter 12 and/or receiver/controller 14 may include the following:

The transmitter 12 should be housed in a plastic injection molded case suitable for wireless remote control operations. Dimensions are approximately 120 mm long by 80 mm wide by 30 mm thick.

The transmitter 12 shall have a removable battery door for replacement of the battery.

The receiver/controller 14 should have a PCB that is designed to mount inside of the Models 135 146 and 155 cases. The dimension of the PCB is approximately 90 by 40 mm.

SCOPE OF THE INVENTION

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

What is claimed is:

1. Apparatus for controlling a search lamp having driver motors for moving the search lamp, comprising:

a wireless searchlight transmitter configured to:

receive user inputs containing information about controlling the functionality of the search lamp, including turning the search lamp on and off, moving the search lamp left or right, moving the search lamp up or down, moving the search lamp diagonally, sweeping the search lamp with continuous movement, moving the search lamp at a fast speed or a slow speed, and initiating a learn mode, and provide signaling containing information about the user inputs, the signaling being transmitted using FM wireless digitally encoded modulation on a fixed frequency with an N bit digital code setting that provides $2^N$ different digital code settings; and a wireless searchlight receiver/controller configured to:

receive the signaling, and provide corresponding signaling containing information for controlling the functionality of the search lamp, based at least partly on the signaling received, wherein the wireless searchlight transmitter is configured to activate a learn mode when the user inputs include slow and fast buttons being depressed.

2. Apparatus according to claim 1, wherein the FM wireless digitally encoded modulation is based on using an FM Frequency Shift Key (FSK) scheme at a data rate of less than a 1000 bits per second with a transmitter frequency of 433.92 MHz UHF that is crystal controlled, so as to substantially minimize FM interference in relation to signals generated from other surrounding devices otherwise broadcasting typically in a range of about 303-390 MHz, including garage door openers, lighting controls and ceiling fan controls.

3. Apparatus according to claim 2, wherein a complete transmission from the wireless searchlight transmitter to the wireless searchlight receiver/controller comprises a synchronization frame having N bits of unique address information, N/2 bits of key code information, and an N/2-bit checksum.

4. Apparatus according to claim 2, wherein the synchronization frame may be repeated multiple time, each time a valid key closure is detected and is repeated as long as a key on a keypad is depressed by a user.

5. Apparatus according to claim 1, wherein a complete transmission from the wireless searchlight transmitter to the receiver comprises a synchronization frame having N bits of unique address information, N/2 bits of key code information, and an N/2-bit checksum.

6. Apparatus according to claim 1, wherein the FM wireless digitally encoded modulation is based on using a pulse-position modulation (PPM) scheme.

7. Apparatus according to claim 1, wherein the N bit digital code setting is a random code setting.

8. Apparatus according to claim 1, wherein the wireless searchlight receiver/controller is programmed to automatically shut the search lamp off after a predetermined period of time.

9. Apparatus according to claim 1, wherein the wireless searchlight transmitter includes a sweep key for initiating a back and forth movement of the search lamp.

10. Apparatus according to claim 9, wherein the sweep key is a toggle switch for turning the back and forth movement on and off.

11. Apparatus according to claim 1, wherein the wireless searchlight transmitter includes a fast key for initiating a fast movement of the search lamp and a slow key for initiating a slow movement of the search lamp.

12. Apparatus according to claim 11, wherein the fast movement remains on until the slow key is pressed, and the slow movement remains on until the fast key is pressed.

13. Apparatus according to claim 1, wherein the wireless searchlight transmitter includes directional keys for initiating horizontal, vertical or diagonal movement of the search lamp for positioning the search light.

14. Apparatus according to claim 13, wherein the horizontal, vertical or diagonal movement of the search lamp continues until one or more depressed key are released.

15. Apparatus according to claim 13, wherein the diagonal movement is initiated by simultaneously depressing horizontal and vertical keys.

16. Apparatus according to claim 1, wherein the apparatus comprises the search lamp having the driver motors for moving the search lamp.

17. Apparatus comprising:
a search lamp configured with driver motors for moving the search lamp;
a wireless searchlight transmitter configured to:
receive user inputs containing information about controlling the functionality of the search lamp, including turning the search lamp on and off, moving the search lamp left or right, moving the search lamp up or down, moving the search lamp diagonally, sweeping the search lamp with continuous movement, moving the search lamp at a fast speed or a slow speed, and initiating a learn mode, and
provide signaling containing information about the user inputs, the signaling being transmitted using FM wireless digitally encoded modulation on a fixed frequency with an N bit digital code setting that provides $2^N$ different digital code settings; and
a wireless searchlight receiver/controller configured to:
receive the signaling, and
provide corresponding signaling containing information for controlling the functionality of the search lamp, based at least partly on the signaling received; and
the FM wireless digitally encoded modulation being based on using an FM Frequency Shift Key (FSK) scheme at a data rate of less than a predetermined number of bits per second (BPS) with a transmitter frequency of 433.92 MHz UHF that is crystal controlled, so as to substantially minimize FM interference in relation to signals generated from another surrounding device otherwise broadcasting typically in a range of about 303-390 MHz, including garage door openers, lighting controls and ceiling fan controls,
wherein the wireless searchlight transmitter is configured to activate a learn mode when the user inputs include slow and fast buttons being depressed.

18. Apparatus according to claim 17, wherein a complete transmission from the wireless searchlight transmitter to the wireless searchlight receiver/controller comprises a synchronization frame having N bits of unique address information, N/2 bits of key code information, and an N/2-bit checksum.

19. Apparatus according to claim 18, wherein the synchronization frame may be repeated multiple time, each time a valid key closure is detected and is repeated as long as a key on a keypad is depressed by a user.

20. Apparatus according to claim 1, wherein the signaling contains information about a special learn code instead of normal slow and fast commands.

21. Apparatus according to claim 17, wherein the signaling contains information about a special learn code instead of normal slow and fast commands.

* * * * *